United States Patent [19]

Anderson

[11] Patent Number: 5,452,569
[45] Date of Patent: Sep. 26, 1995

[54] LAWNMOWER BLADE WITH OUTER LEADING SIDE AND ANGLED END CUTTING EDGES

[76] Inventor: Ray S. Anderson, P.O. Box 498, Bell Buckle, Tenn. 37020

[21] Appl. No.: 369,429

[22] Filed: Jan. 6, 1995

[51] Int. Cl.[6] ................................................. A01D 34/73
[52] U.S. Cl. ................................................................ 56/295
[58] Field of Search ........................... 56/17.5, 255, 295, 56/DIG. 20

[56] References Cited

U.S. PATENT DOCUMENTS

| 2,857,729 | 10/1958 | Zoldok | 56/295 |
| 3,022,621 | 2/1962 | Zavarella | 56/295 |
| 3,214,896 | 11/1965 | Watkins et al. | 56/295 |
| 3,452,524 | 7/1969 | Guettermann | 56/295 |
| 3,949,541 | 4/1976 | Henry | 56/295 |
| 3,998,037 | 12/1976 | Deans et al. | 56/295 |
| 4,318,268 | 3/1982 | Szymanis | 56/295 X |
| 4,532,708 | 8/1985 | Mensing | 56/295 |
| 4,779,407 | 10/1988 | Pattee | 56/295 |
| 5,197,268 | 3/1993 | Barrera | 56/295 |
| 5,233,820 | 8/1993 | Willsie | 56/295 |
| 5,291,725 | 3/1994 | Meinerding | 56/295 |
| 5,299,414 | 4/1994 | Long | 56/295 X |

Primary Examiner—David J. Bagnell
Attorney, Agent, or Firm—John R. Flanagan

[57] ABSTRACT

A lawnmower blade includes an elongated flat bar having a central aperture for attachment of the flat bar to a rotary drive shaft for rotation of the blade in a predetermined direction in concert with rotation of the rotary drive shaft. The flat bar has a pair of opposite portions, extending in opposite directions from the aperture. A pair of first cutting edges are defined along outer sections of leading sides of the opposite portions of the flat bar and extend substantially perpendicular to the tangential direction of the path of rotation of the blade. A pair of second cutting edges are defined along outer ends of opposite portions of the flat bar and extend angularly outwardly from the outer leading side cutting edges to the outer trailing sides of the flat bar relative to the direction of rotation of the blade. The pair of straight outer leading side cutting edges also can have a plurality of crescent-shaped serrations or sawtooth-shaped serrations formed therein.

19 Claims, 1 Drawing Sheet

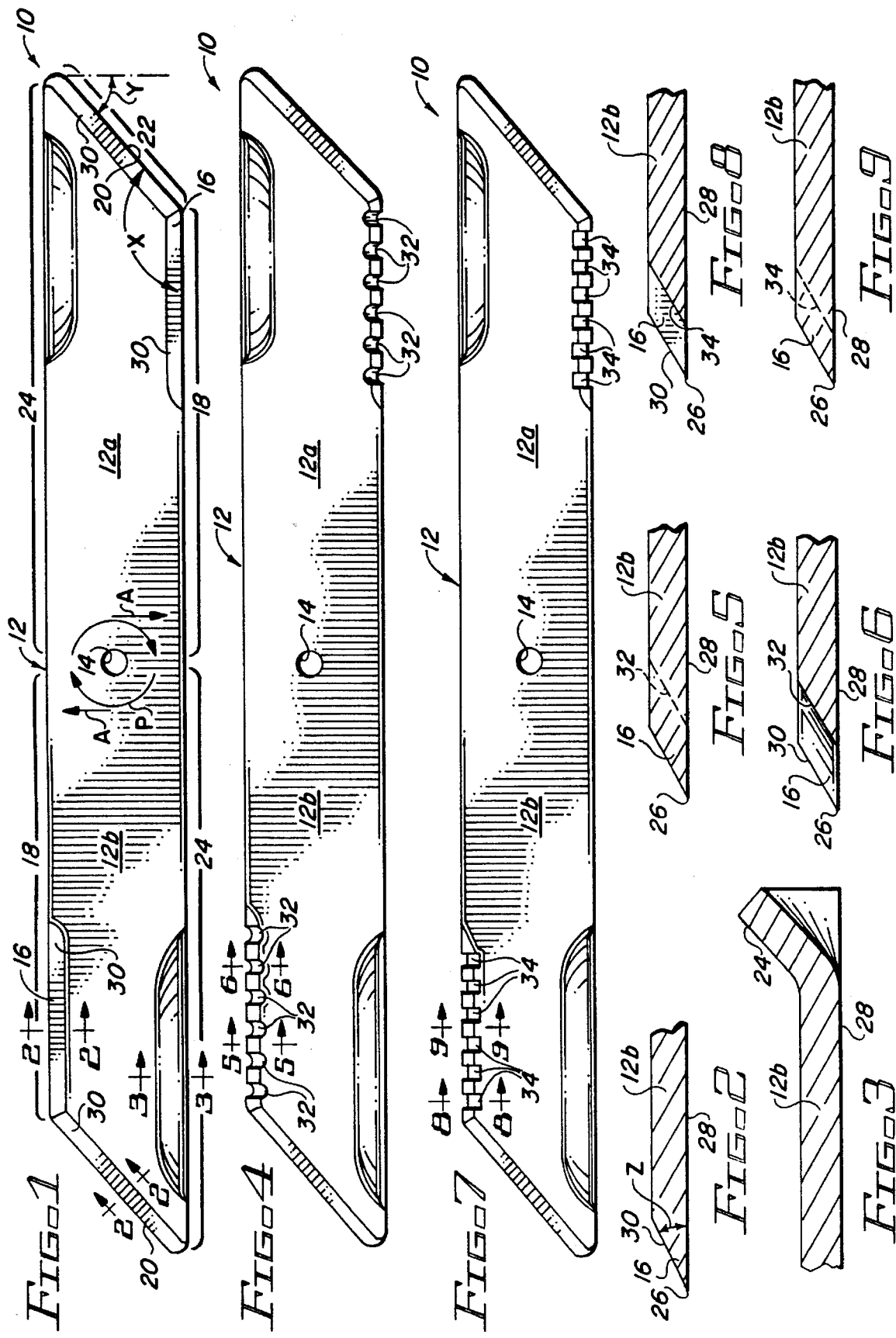

5,452,569

LAWNMOWER BLADE WITH OUTER LEADING SIDE AND ANGLED END CUTTING EDGES

BACKGROUND OF THE INVENTION

1. Field of the Invention

The present invention generally relates to the design of lawnmower blades and, more particularly, is concerned with a lawnmower blade with outer leading side cutting edges and angled end cutting edges.

2. Description of the Prior Art

Rotary lawnmower blades in widespread use at the present time typically cut grass only at straight cutting edges defined along outer sections of their leading sides. This method of cutting grass creates a chopping effect and has a tendency to push grass down in front of the advancing blade, which frequently causes mowers to stall in heavy growth. This chopping effect may also bruise blades of grass as it cuts and thus can be detrimental to the health of the lawn. To perform satisfactorily, these blades also require frequent re-sharpening of the cutting edges. Most lawnmowers also require the user to collect or bag the cut grass.

Various proposals in the prior art have to a limited extent addressed improving the effectiveness of lawnmower blades in cutting and mulching grass. These proposals have focused on variations in the arrangements of blades and changes in serration configurations on the cutting edges. Representative examples are disclosed in U.S. Pat. No. 3,022,621 to Zavarella, U.S. Pat. No. 3,214,896 to Watkins et al., U.S. Pat. No. 3,452,524 to Guetterman, U.S. Pat. No. 3,949,541 to Henry, U.S. Pat. No. 3,998,037 to Deans et al., U.S. Pat. No. 4,532,708 to Mensing, U.S. Pat. No. 4,779,407 to Pattee, U.S. Pat. No. 5,197,268 to Barrera, U.S. Pat. No. 5,233,820 to Willsie and U.S. Pat. No. 5,291,725 to Meinerding.

While each of these proposals may provide advantages in specific ways, many of them are complex and only do so to a limited extent. Consequently, a need still exists for a simple and practical solution for the improvement of lawnmower blade cutting and mulching of grass with general application.

SUMMARY OF THE INVENTION

The present invention provides a lawnmower blade with outer leading side and angled end cutting edges designed to satisfy the aforementioned need. The blade of the present invention includes an elongated flat bar having an aperture for attachment of the flat bar to a rotary drive shaft for rotation of the blade in a predetermined direction in concert with rotation of rotary drive shaft. The flat bar has a pair of opposite portions, extending in opposite directions from the aperture. A pair of first outer cutting edges are defined along outer sections of a pair of leading sides of the opposite portions of the flat bar and extend substantially perpendicular to a direction extending tangentially of the path of rotation of the blade. A pair of second outer cutting edges are defined along a pair of outer ends of the opposite portions of the flat bar and extend angularly outwardly from the leading sides to the trailing sides of the flat bar and relative to the tangential direction of the path of rotation the blade.

The orientation of each angled end cutting edge relative to the tangential direction of the path of rotation of the blade provides a scythe-like, instead of chop-like, cutting action. This scythe-like cutting action adapts the blade of the present invention to cut significantly wider stalk diameters of heavy grass or brush than can be cut by conventional blades. The pair of leading side and angled end cutting edges together create a mulching action when the discharge chute of the lawnmower housing is covered.

Accordingly, the present invention is directed to a lawnmower blade which comprises: (a) an elongated flat bar having a central means for attaching the flat bar to a rotary drive shaft and a pair of opposite portions extending in opposite directions from the central attaching means; (b) a pair of first outer cutting edges defined along outer sections of a pair of leading sides of opposite portions of the flat bar; and (c) a pair of second outer cutting edges defined along a pair of outer ends of the opposite portions of the flat bar. The pair of first outer cutting edges are straight and extend substantially perpendicular to a direction extending tangentially of the path of rotation of the blade. The pair of second outer cutting edges extend angularly outwardly from the leading sides to trailing sides of the flat bar at an acute angle relative to the tangential direction of the path of rotation of the blade.

Also, the pair of straight outer leading side cutting edges of the mulching blade also can have crescent-shaped serrations or sawtooth-shaped serrations formed therein which enhance the mulching ability of the blade.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a top plan view of a first embodiment of the lawnmower blade of the present invention having pairs of straight outer leading side cutting edges and straight outer angled end cutting edges.

FIG. 2 is an enlarged fragmentary transverse sectional view of one of the straight outer leading side cutting edges of the lawnmower blade taken along lines 2—2 of FIG. 1.

FIG. 3 is enlarged fragmentary transverse sectional view of a bent up trailing edge of the lawnmower blade taken along line 3—3 of FIG. 1.

FIG. 4 is a top plan view of a second embodiment of the lawnmower blade of the present invention having a pair of straight outer leading side cutting edges with crescent-shaped serrations formed therein and a pair of straight outer angled end cutting edges.

FIG. 5 is an enlarged fragmentary transverse sectional view of one of the crescent-shaped serrated outer leading side cutting edges of the lawnmower blade taken along line 5—5 of FIG. 4.

FIG. 6 is another enlarged fragmentary transverse sectional view of one of the crescent-shaped serrated outer leading-side cutting edges of the lawnmower blade taken along line 6—6 of FIG. 4.

FIG. 7 is a top plan view of a third embodiment of the lawnmower blade of the present invention having a pair of straight outer leading side cutting edges with sawtooth-shaped serrations formed therein and a pair of straight outer angled end cutting edges.

FIG. 8 is an enlarged fragmentary transverse sectional view of one of the sawtooth-shaped serrated outer leading side cutting edges of the lawnmower blade taken line 8—8 of FIG. 7.

FIG. 9 is another enlarged fragmentary transverse sectional view of one of the sawtooth-shaped serrated outer leading side cutting edges of the lawnmower blade taken along line 9—9 of FIG. 7.

DETAILED DESCRIPTION OF THE INVENTION

Referring to the drawings and particularly to FIGS. 1, 4 and 7, there is illustrated respective first, second and third embodiments of a lawnmower blade, generally designated 10, in accordance with the present invention. Basically, the blade 10 of each of the embodiments includes an elongated flat rigid bar 12 having a central aperture 14 for attachment of flat bar 12 in a known manner to a conventional rotary drive shaft (not shown) of a mower for rotation of the mulching blade 10 in concert with the rotation of rotary drive shaft. The flat bar 12 has a pair of opposite portions 12a and 12b, extending in opposite directions from the central aperture 14.

Referring now to FIGS. 1–3, there is illustrated the first embodiment of the blade 10 of the present invention. Relative to its path P of rotation, the blade 10 includes a pair of first outer cutting edges 16 defined along outer sections of a pair of leading sides 18 of the opposite portions 12a and 12b of flat bar 12 being diagonally opposite one another relative to the central aperture 14 and extending in opposite directions therefrom. The first cutting edges 16 extend substantially perpendicular to a direction, as represented by arrows A, extending tangentially of the path P of rotation of the blade 10. The blade 10 also includes a pair of second cutting edges 20 defined along outer ends 22 of the opposite portions 12a and 12b of flat bar 12. The second cutting edges 20 extend angularly outwardly from the respective adjacent outer leading cutting edges 16 to the respective trailing sides 24 of flat bar 12 also being diagonally opposite one another relative to the central aperture 14 and extending in opposite directions therefrom.

Preferably, each of the second outer end cutting edges 20 extends at an obtuse included angle X falling within a range of from about 135 to 165 degrees relative to the first outer leading cutting edges 16. Stated in another way, preferably, each of the second outer end cutting edges 20 extends at an acute angle Y falling within a range of from about 45 to 65 degrees relative to the tangential direction A of the path P of rotation of the blade 10.

More particularly, as shown in FIG. 2, each of the outer side and end cutting edges 16, 20 is defined by an intersection 26 of the bottom surface 28 on the flat bar 12 with a narrow beveled edge surface 30 formed on the outer sections of the respective leading sides 18 and outer ends 22 of the flat bar 12. The bottom and beveled edge surfaces 28, 30 form an acute included angle Z preferably falling within a range of from about 30 to 45 degrees. Also, the mulching blade 10 has outer sections of each trailing side 24 of the flat bar 12 that are bent up at an acute angle from the plane of the flat bar 12.

Referring now to FIGS. 4–6, there is illustrated the second embodiment of blade 10 having the same construction as described above with resepect to the first embodiment of FIGS. 1–3. In addition thereto, the second embodiment of the blade 10 has a plurality of serrations 32 defined on the leading side cutting edges 16. The serrations 32 shown here are curved or crescent-shaped and defined by alternating portions of the beveled edge surfaces 30 being offset from one another. The angled outer end cutting edges 20 do not have such serrations formed therein, but rather are straight, being of the construction as in the first embodiment of the blade 10.

Referring now to FIGS. 7–9, there is illustrated the third embodiment of the blade 10 having the same construction as described above with resepect to the first embodiment of FIGS. 1–3. In addition thereto, the third embodiment of the blade 10 has a plurality of serrations 34 defined on the leading side cutting edges 16. The serrations 34 shown here are square or sawtooth-shaped and defined by alternating portions of the beveled edge surfaces 30 being offset from one another. The angled outer end cutting edges 20 do not have such serrations formed therein, but rather are straight, being of the construction as in the first embodiment of the blade 10.

In summary, the above-described second outer angled end cutting edges 20 provide the blade 10 with an advantageous scythe-like cutting action as opposed to merely the disadvantageous chop-like cutting action of the straight cutting edges 16. This scythe-like cutting action of the second outer angled end cutting edges 20 adapts the blade 10 of the present invention to cut significantly wider stalk diameters of heavy grass or brush than can be cut by conventional blades. Also, the upwardly bent outer trailing side sections 24 of the flat bar 12 tend to create a vacuum as the blade 10 rotates, thereby raising the grass blades to enable outer angled end cutting edges 20 to slice through them. The pair of outer leading side cutting edges 16 and angled end cutting edges 20 in combination create a mulching action by recurring the grass clippings when a conventional discharge chute (not shown) of a mower lawnmower blade housing (not shown) is covered. The mulching action is heightened especially by the presence of the crescent-shaped or sawtooth-shaped serrations 32, 34 of the outer side cutting edges 16 which tend to grab the grass clippings and to cut them into smaller and smaller pieces.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A lawnmower blade, comprising:
   (a) an elongated flat bar having a central means for attaching said flat bar to a rotary drive shaft, said flat bar also having a pair of opposite outer ends and a pair of leading sides disposed diagonally opposite one another relative to said central attaching means and extending in opposite directions therefrom;
   (b) a pair of first outer cutting edges defined along outer sections of said respective leading sides of said flat bar; and
   (c) a pair of second outer cutting edges defined along said respective outer ends of said flat bar extending outwardly at obtuse included angles relative to said respective first outer cutting edges, said second outer cutting edges extending angularly outwardly from said leading sides to a pair of trailing sides of said flat bar being disposed opposite from said leading sides, said second outer cutting edges also extending at acute angles relative to a tangential direction of a path of rotation of said blade.

2. The blade of claim 1 wherein said obtuse included angle falls within a range of from about 135 to 165 degrees.

3. The blade of claim 1 wherein said first outer cutting edges are substantially equal in length to one another.

4. The blade of claim 1 wherein said second outer cutting edges are substantially equal in length to one another.

5. The blade of claim 1 wherein said first outer cutting edges are substantially straight and extend substantially perpendicular to a direction extending tangentially of a path of rotation of said blade.

6. The blade of claim 1 wherein said second outer cutting edges extend substantially straight from said leading sides to said trailing sides of said flat bar.

7. The blade of claim 1 wherein said trailing sides of said flat bar are bent up at acute angles thereto to create a vacuum effect as said blade is rotated to thereby raise grass stems and facilitate slicing thereof by said second outer cutting edges.

8. The blade of claim 1 further comprising:

(d) means defining a plurality of serrations in said first outer cutting edges and being disposed in spaced relation to one another.

9. The blade of claim 8 wherein said serrations are crescent-shaped.

10. The blade of claim 8 wherein said serrations are sawtooth-shaped.

11. A lawnmower blade, comprising:

(a) an elongated flat bar having a central means for attaching said flat bar to a rotary drive shaft for rotation of said flat bar along a predetermined path and in a predetermined direction in concert with rotation of the rotary drive shaft, said flat bar also having a pair of opposite portions extending in opposite directions from said central attaching means, said flat bar further having a pair of opposite outer ends and a pair of leading sides disposed diagonally opposite one another relative to said central attaching means and extending in opposite directions therefrom;

(b) a pair of first outer cutting edges defined along outer sections of said respective leading sides of said opposite portions of said flat bar, said first outer cutting edges being substantially straight;

(c) a pair of second outer cutting edges defined along said respective outer ends of said opposite portions of said flat bar and extending outwardly at obtuse included angles relative to said respective first outer cutting edges, said second outer cutting edges being substantially straight and extending angularly outwardly from said leading sides to a pair of trailing sides of said flat bar being disposed opposite from said leading sides, said second outer cutting edges also extending at acute angles relative to a tangential direction of the path of rotation of said blade; and (d) means defining a plurality of serrations in said first outer cutting edges and being disposed in spaced relation to one another.

12. The blade of claim 11 wherein said obtuse included angle falls within a range of from about 135 to 165 degrees.

13. The blade of claim 11 wherein said central attaching means is an aperture.

14. The blade of claim 11 wherein said first outer cutting edges are substantially equal in length to one another.

15. The blade of claim 11 wherein said second outer cutting edges are substantially equal in length to one another.

16. The blade of claim 11 wherein said first outer cutting edges extend substantially perpendicular to a direction extending tangentially of the path of rotation of said blade.

17. The blade of claim 11 wherein said trailing sides of said flat bar are bent up at acute angles thereto to create a vacuum effect as said blade is rotated to thereby raise grass stems and facilitate slicing thereof by said second outer cutting edges.

18. The blade of claim 11 wherein said serrations are crescent-shaped.

19. The blade of claim 11 wherein said serrations are sawtooth-shaped.

* * * * *